United States Patent [19]

Kopras

[11] Patent Number: 5,323,823
[45] Date of Patent: Jun. 28, 1994

[54] WOOD ROUTER BIT

[75] Inventor: Robert K. Kopras, Blackearth, Wis.

[73] Assignee: Roto Zip Tool Corporation, Cross Plains, Wis.

[21] Appl. No.: 989,100

[22] Filed: Dec. 11, 1992

[51] Int. Cl.[5] .................. B27G 13/02; B23C 5/10; B23B 51/02; B23D 13/00
[52] U.S. Cl. .................. 144/219; 144/221; 407/54; 407/63; 408/227; 408/230
[58] Field of Search ............... 407/54, 63; 144/219, 144/220, 221, 240, 241; 408/227, 230

[56] References Cited

U.S. PATENT DOCUMENTS

| | | |
|---|---|---|
| 1,702,812 | 2/1929 | Cochran .................. 407/54 |
| 1,963,611 | 6/1934 | Brumell et al. . |
| 3,003,224 | 10/1961 | Ribich . |
| 3,701,188 | 10/1972 | Wall et al. . |
| 4,480,949 | 11/1984 | Van De Bogart . |
| 4,655,650 | 4/1987 | Crawford et al. . |
| 4,712,984 | 12/1987 | Kidani . |
| 4,893,968 | 1/1990 | Levy . |
| 5,004,384 | 4/1991 | Hosoi . |
| 5,046,902 | 9/1991 | Zubov et al. .................. 408/230 |
| 5,049,009 | 9/1991 | Beck et al. . |
| 5,143,490 | 9/1992 | Kopras . |

FOREIGN PATENT DOCUMENTS

| | | |
|---|---|---|
| 273627 | 1/1912 | Fed. Rep. of Germany . |
| 319407 | 1/1972 | U.S.S.R. . |
| 608745 | 9/1948 | United Kingdom .................. 408/230 |

*Primary Examiner*—William E. Terrell
*Attorney, Agent, or Firm*—Wood, Herron & Evans

[57] ABSTRACT

A router bit for laterally cutting through sheets of wood product, such as plywood and the like. The bit includes a shank portion adapted to be gripped in the chuck of a router, a fluted portion, and a tip. The fluted portion has two helical left-hand flutes. Each flute has a cutting edge and a web portion having a convex surface that extends rearwardly and immediately inwardly from the cutting edge, without a land, in a continuous curve. The flutes are formed by parabolic grinding. In one embodiment the tip is conical in shape and has two diametrically opposed tip flutes for cutting axially into a workpiece. In another embodiment the tip is flat and the bit is adapted only to cut laterally through the workpiece.

9 Claims, 1 Drawing Sheet

WOOD ROUTER BIT

FIELD OF THE INVENTION

The present invention is generally related to router bits and more specifically to a bit designed to easily cut wood in a lateral direction, especially a sheet of wood product such as plywood.

BACKGROUND OF THE INVENTION

Typically, sheets of wood product, such as plywood and the like, are cut with various types of saws depending on the desired shape of the cut. For example, table saws or circular saws are generally used to cut along a straight path and band saws or saber saws may be used to cut along curved paths. It is difficult to make a smooth curved cut using a band saw or a saber saw since the saw blade is flat and therefore most naturally follows a straight path. Also, when using a band saw to cut plywood, difficulty arises when trying to maneuver a large sheet of plywood along a desired path into the blade. In the case of using a saber saw, blade breakage commonly occurs due to the twisting action or torque that the blade necessarily goes through as it is forced around a curved path. This twisting action causes the blade to encounter shear forces that it may not be able to withstand, especially if used to cut a curve of small radius.

Router bits are also used to make both straight line and curved line cuts in wood and other similar materials. Router bits withstand much higher shear forces than do the flat blades used in a saber saw, for example. Such bits have generally included one or more straight or helical cutting flutes. Tip flutes have also been used to allow the bit to first cut in the axial direction before cutting in a lateral direction.

One example of a helically fluted wood cutting router bit is shown in U.S. Pat. No. 1,963,611 issued to Brumell et al. in 1934. The bit disclosed by Brumell et al. includes two helical flutes, each flute having a flat land or thread 10 extending rearwardly from a cutting edge 11. The flutes and lands are disclosed as being either right-handed or left-handed. The spiral lands 10 are stated to act as conveyors for clearing the chips from the cuts so that clogging of the cutter and resultant resistance thereto is, to a large extent, eliminated. The patent to Brumell et al. fails to disclose the use of a parabolic grind and instead appears to use a conventional grind.

Another example of a helically fluted router bit for cutting wood is disclosed in U.S. Pat. No. 3,701,188 to Wall et al. In FIG. 2 Wall et al. show a router bit having a single closed left-handed helical flute. The width of the flute spans approximately half the circumference of the body of the router bit. The router bit of Wall et al. is disclosed as being parabolically ground.

Wood router bits such as those described above each have certain disadvantages. Single fluted router bits such as those contemplated by Wall et al. lack strength when formed in relatively small diameters such as ⅛", if used to perform lateral cutting operations on wood sheet products, such as plywood. Wood cutting router bits such as the router bit of Brumell et al. having lands and lacking a parabolic grind tend to be relatively slow cutting. Thus, router bits of this type are also subject to increased breakage due to operators forcing the bit to work faster than its design allows.

Thus, there has been a need for a router bit for cutting wood sheet products, such as wood, plywood, high density chipboard, and the like, which is sufficiently strong that it can be made in a diameter as small as ⅛" without an excessive breakage rate during use, yet can be quickly and easily guided along a cutting path in the sheet product without producing excessive burring along the top of the line of cut.

SUMMARY OF THE INVENTION

According to a preferred embodiment of this invention, a router bit is provided which has two left-handed helical flutes which are parabolically ground and have no land adjacent the cutting edge. The left-handed direction of the flutes tends to convey the cut chips downwardly into the workpiece, rather than upwardly toward the operator, to reduce the amount of debris sent in the direction of the operator and to reduce the burring effect on the top of the workpiece along the cutting path. It has been found especially desirable that the body flutes be of a so called "parabolic grind" configuration, having an S-shaped curvature as viewed in transverse cross-section. Also, the lack of any land extending rearwardly (circumferentially) from the cutting edge causes the S-shaped curvature to be continuous from one cutting edge to the opposite cutting edge. In other words, there is no flat portion of the S-shaped curve.

The tip of the router may include tip flutes for allowing the router bit to be used as a drill to first cut axially into the workpiece before cutting laterally along a cutting path in the workpiece. These tip flutes may take many forms. In a preferred embodiment of the present invention, the tip is conically shaped and has straight edged flutes diametrically opposed to one another. Optionally, the tip of the router bit may be flat. In this case, the router bit is designed solely for lateral cutting operations.

BRIEF DESCRIPTION OF THE DRAWINGS

The invention can best be further described by reference to the accompanying drawings in which.

DETAILED DESCRIPTION

Figure 1:
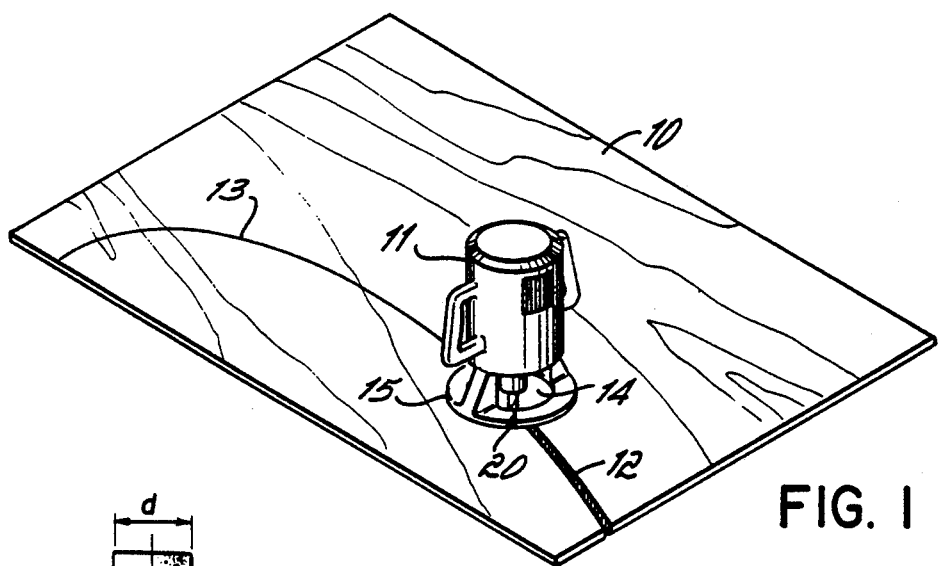
FIG. 1 is a diagrammatic perspective view showing a hand-guided router cutting a curved path through a sheet of plywood with the router bit of the present invention.

FIG. 1 illustrates an exemplary use of the router bit of the present invention. Here, a conventional hand-guided router 11 is used to make a curved cut 12 along a path 13 through a sheet of plywood 10. Ideally, the router 11 has a "window" or open area 14 in its base 15 which enables the operator to see the router bit in relation to the intended cutting path 13. Alternatively, the router 11 may be used with a jig or guide mechanism to guide the bit along a desired cutting path.

Figure 2:
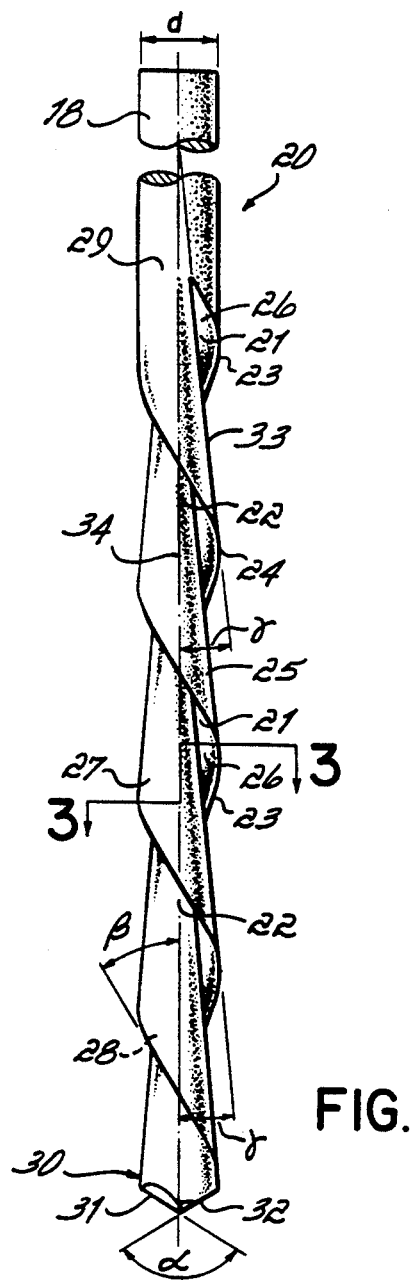
FIG. 2 is a side elevational view of the router bit of the present invention.

In FIG. 2, a preferred form of the router bit 20 of the present invention is shown and includes a shank portion 18 adapted to be gripped in the chuck (not shown) of the router for rotating the bit. The bit 20 further includes an intermediate portion having two flutes 21, 22 extending in a left-hand helix downwardly toward a tip portion 30. The flutes 21, 22 have outer surfaces 25, 27, and as shown in axial profile at 33 in FIG. 2, each outer surface 25, 27 extends at a slight, acute angle γ with respect to axis 34 of bit 20. Angle γ is preferably approximately 6° as also shown in FIG. 2. The tip portion 30 is preferably conical in shape and includes two diametrically opposed straight-edged flutes 31, 32 for allowing the router bit to be used in a drill-like fashion to cut axially into the workpiece. The optimum tip angle α between the two diametrically opposed tip flutes 31, 32 is approximately 118°. The helix angle β of the cutting edges 23, 24, with respect to the axis 34 of the bit, is preferably about 29° ±2°. The diameter d of the router bit is preferably about ⅛".

Figure 3:
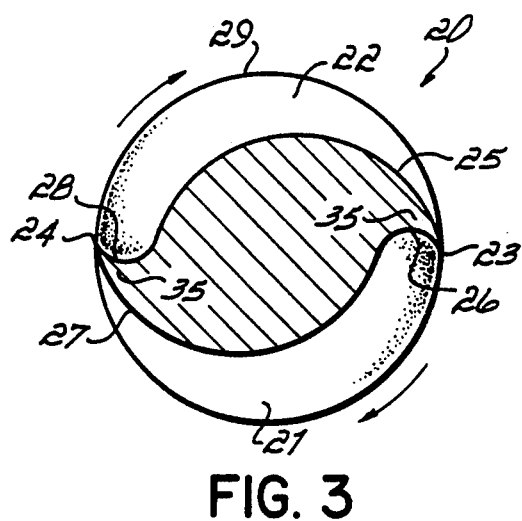
FIG. 3 is an enlarged cross-section of the bit along taken on line 3—3 of FIG. 2.

Turning now to FIG. 3, the body flutes 21, 22 are shown in cross-section and include two helical cutting edges 23, 24. Each body flute 21, 22 includes a convex surface portion 25, 27 extending rearwardly from the cutting edges 23, 24. Each of these convex surfaces 25, 27 also extends inwardly from an outermost circumference 29 of the fluted section 21,22 of the bit 20 immediately rearward of its associated cutting edge 23, 24. Each convex surface portion 25, 27 is part of an S-shaped curve that extends in a continuous curve from one cutting edge to the other. This S-shaped curve can be formed by a "parabolic" grinding process, as described in applicant's U.S. Pat. No. 5,143,490. U.S. Pat. No. 5,143,490 is hereby fully and expressly incorporated by reference herein.

As shown in FIG. 3, a "parabolic" grind configuration has a flute 22 having a web portion 35 behind the cutting face 26. The flute 22, viewed in cross-section immediately begins to curve convexly inwardly from cutting edge 23 on the outer circumference 29. The flute 22 continues to curve convexly inwardly in the rearward direction until it joins a concavely curved face 28 leading to an acute angle at which it joins the opposite cutting edge 24. Likewise, a web portion 35 has a convexly curved surface 27 which extends immediately inwardly from the outer circumference 29 and rearwardly from cutting edge 24 and leads into a concavely shaped face 26 which ends at an acute angle at the opposite cutting edge 23.

As clearly shown in FIG. 3, there are no lands formed adjacent to and rearward of the cutting edges 23, 24. The convex inward curvature begins immediately at the cutting edge. Nevertheless, this configuration provides webs 35 of substantial mass behind each cutting edge 23, 24. Moreover, the absence of a land has been found to provide greatly improved lateral cutting speed and to improve bit cutting life as well. This strengthens the bit and reduces breakage, especially in relatively small diameter bits, in comparison to bits having differently shaped flute sections.

In contrast to a conventional grind, the convexly curved surfaces 25, 27 do not have lands adjacent the cutting edges 23, 24. Parabolic grinding (which does not necessarily form a true parabolic curve in the flutes) is known in the flute grinding art, however, except for its disclosure in the above-mentioned related U.S. Pat. No. 5,143,490, it apparently has not previously been used in a left-hand, "no land" flute configuration in a bit for laterally cutting wood products.

Surprisingly, it has been found that the use of a parabolic grind flute configuration tends to strengthen the bit by providing a larger and stronger body or web 35 of metal in the area behind each cutting edge 23,24. Thus, even when the bit 20 is formed in diameters as small as ⅛", the bit 20 will not break or wear unduly; it in fact substantially out cuts other bits. Indeed, router bits 20 in such a small diameter are generally ineffective and short lived if used to cut laterally. It has also been found that only two flutes 21, 22 should be provided on the bit 20.

In comparison to the use of three or more flutes, using only two flutes in the described configuration has been found to increase the speed at which the bit will cut through the workpiece and yet still provide sufficient strength to minimize breakage.

The bit 20 is preferably formed from a cylindrical rod of tool steel, for example, molybdenum type high-speed tool steel such as grade M1. After grinding, the bit is hardened, preferably to 60-65 Rockwell "C" hardness. Hardening is preferably carried out by heating an M1 steel bit to about 2205° F. in a diamond block controlled (reducing) atmosphere furnace; oil quenching it; and twice annealing it by heating to 1020° F. for two hours followed by slow cooling to room temperature.

Accordingly, the present invention provides a wood cutting router bit that makes lateral cuts faster and with a lower breakage rate than prior router bits. The bit is easily controllable to follow a desired cutting path, even in free-hand routing, that is, without a guide. The bit does not chatter, or jump, even in woods with strong grain such as oak. The left-handed helical flute configuration directs chips downwardly into the workpiece rather than upwardly toward the operator. This reduces the amount of debris that could both obscure the intended cutting path and hit the operator. In addition, the downward spiral of the flutes tends to prevent burring which naturally occurs on the upper surface of the workpiece when using bits having upward by spiraling or right-handed helical flutes.

These and other objectives and advantages of the invention will become readily apparent to one of ordinary skill in the art without departing from the scope of the invention, and applicant intends to be bound only by the claims appended hereto.

I claim:
1. A router bit comprising:
   on upper shank portion for being gripped by a chuck;
   a lower tip; and,
   two flutes extending helically in a left-hand spiral between said shank portion and said tip, each flute having a helically shaped cutting edge, each flute in cross-section forming a continuous S-shaped curve beginning at said cutting edge and extending immediately inwardly and rearwardly in a continuous convexly shaped curve leading to a continuous concavely shaped curve and ending at an opposed cutting edge, said S-shaped curves of said two flutes including no lands adjacent said cutting edges, the portions of said flutes which are convexly shaped in section forming a slight acute angle with respect to the axis of the bit extending downwardly to said cutting edge when viewed in axial profile.

2. The bit of claim 1 wherein said flutes are parabolically ground.

3. The bit of claim 1 wherein said tip converges to a point and includes at least two cutting edges.

4. The bit of claim 3 wherein said cutting edges are diametrically opposed to one another.

5. The bit of claim 4 wherein said tip flute cutting edges have an angle of approximately 118° therebetween.

6. The bit of claim 1 wherein the diameter of said bit is approximately ⅛".

7. The bit of claim 6 wherein each flute has a helix angle of approximately 29°.

8. The bit of claim 1 wherein said angle is approximately 6°.

9. The bit of claim 1, wherein said cross section is of constant shape along the length of said flutes.

* * * * *